United States Patent
Belau et al.

(10) Patent No.: US 7,327,856 B2
(45) Date of Patent: Feb. 5, 2008

(54) ARRANGEMENT AND METHOD FOR PROCESSING IMAGE DATA

(75) Inventors: Horst Belau, Langquaid (DE); Reinhard Rosl, Bernhardswald (DE); Stefan Spalke, Barbing (DE); Ulrich Wagner, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 630 days.

(21) Appl. No.: 10/478,510

(22) PCT Filed: May 25, 2001

(86) PCT No.: PCT/DE01/02015

§ 371 (c)(1),
(2), (4) Date: Jun. 14, 2004

(87) PCT Pub. No.: WO02/095681

PCT Pub. Date: Nov. 28, 2002

(65) Prior Publication Data

US 2004/0234100 A1    Nov. 25, 2004

(51) Int. Cl.
*G06K 9/00* (2006.01)
(52) U.S. Cl. .......................... 382/106; 280/735
(58) Field of Classification Search ............... 382/100, 382/104, 106; 280/732, 735; 340/436, 438, 340/901, 903; 701/45, 301
See application file for complete search history.

(56) References Cited

U.S. PATENT DOCUMENTS

| 5,506,793 | A |   | 4/1996  | Straayer et al. |
|-----------|---|---|---------|-----------------|
| 5,528,698 | A | * | 6/1996  | Kamei et al. ............... 382/100 |
| 6,037,860 | A | * | 3/2000  | Zander et al. .............. 340/436 |
| 6,141,432 | A | * | 10/2000 | Breed et al. ................. 382/100 |
| 6,470,271 | B2| * | 10/2002 | Matsunaga ................... 701/301 |

FOREIGN PATENT DOCUMENTS

| EP | 1039314 A2 | 9/2000 |
|----|------------|--------|
| EP | 1087336 A2 | 3/2001 |
| WO | WO 00/44181 | 7/2000 |

* cited by examiner

*Primary Examiner*—Samir Ahmed
*Assistant Examiner*—Abolfazl Tabatabai
(74) *Attorney, Agent, or Firm*—Laurence A. Greenberg; Werner H. Stemer; Ralph E. Locher

(57) ABSTRACT

A source image (S1) distorted by a camera lens can be transformed into a rectified target image (T), by means of a tabular imaging specification. The above occurs during read-out from the image sensor and in real-time. Each source pixel in the source image is assigned none, one or several target pixels in the target image (T1). A first controller (C1) controls the image sensors (B1, B2) accurately with tine and the image equalization and image correlation. A second controller (C2) controls the first controller (C1) and works in a manner temporally decoupled from the above.

18 Claims, 4 Drawing Sheets

ARRANGEMENT AND METHOD FOR PROCESSING IMAGE DATA

CLAIM FOR PRIORITY

This is a national stage application of International Application No. PCT/DE01/02015, which was published in the German language on Nov. 28, 2002 and which was filed in the German language on May 25, 2001.

TECHNICAL FIELD OF THE INVENTION

The invention relates to an arrangement and method for processing image data, particularly in imaging systems for vehicle occupant protection systems.

BACKGROUND OF THE INVENTION

Microsoft Research Technical Report MSR-TR-98-71 "A Flexible New Technique for Camera Calibration" discloses a method for compensating image distortions whereby a mathematical rule is used to map a source image recorded by a camera onto a target image. The computational rule calculates the corrected target image from the source image loaded into main memory.

In occupant protection systems, exacting requirements are placed on the speed of optical image recognition, as the position of a person on a vehicle seat must be rapidly established in the event of an accident in order to deploy the restraint system accordingly. The image sensors provided in the camera of an imaging system record images of an image area in close succession, the resulting image data of an image having to be read out of the image sensor by a control unit before the next image is recorded.

This requires a large amount of memory for storing the image data of an image, precise timing for transmitting the image data to the control unit and considerable computing power for further processing of the images.

SUMMARY OF THE INVENTION

An object of the invention is therefore to cost-effectively reduce the processing overhead for image data.

According to an aspect of the invention, a method for compensating image distortions is provided which can be used particularly in imaging systems for occupant protection systems. An image distorted by the optics of a camera system produces, in the camera system's image sensor, a source image which is distorted in different ways depending on the quality of the optics, the focal length of the camera system and other optical parameters. The source image is preferably broken down into individual source pixels each disposed at a predefined position in the source image and whose grayscale values recorded by the image sensor are in each case stored under a predefined source pixel address in the image sensor.

The source image is preferably mapped into a target image via a predefined mapping rule, whereby a corrected target image is produced. The target image preferably includes target pixels whose grayscale values are stored in each case under a target pixel address in a target memory, a source pixel being mapped into no target pixel or into one or more target pixels, the grayscale value of the source pixel address being transferred to the target pixel address.

The mapping rule for correcting a source image to produce a target image is preferably stored in tabular form in a rectification table in a memory of a first control unit. The first control unit also takes over the complex and time-precise control of the image sensor(s), thereby advantageously enabling the mapping rule to be quickly processed. In addition, it is unnecessary to buffer the source image, thereby saving considerable memory space.

This advantageously reduces the required memory space and simultaneously enables correction of the source image to be performed without delay, which is particularly necessary for occupant protection systems.

Mapping of the source image into the target image according to the specified mapping rule produces a target image having fewer pixels than the source image. There are therefore a number of source pixels which are not mapped into the target pixel. In addition, the image sensor generally captures more information than is actually required. This redundant information is filtered out by the mapping rule. Filtering and data reduction are therefore advantageously performed. Only the target image generated by the mapping rule is stored in the first control unit, which means that memory space is in turn saved in the first control unit.

Two image sensors are preferably connected to the first control unit. The corrected target images are preferably correlated row-wise with one another in the first control unit to produce a range image containing not only grayscale value information but also range information of the relevant image points of the camera. From the image data of the two target images, only part of the range image is preferably formed, buffered, and fed out cyclically or when requested by a second control unit, thereby advantageously saving memory space.

The first control unit controls the image sensor(s), provides timing matched to the image sensor and basically performs all the time-critical and compute-intensive image processing operations. The resulting image data is fed out to a second control unit via a specified interface, preferably a standard interface such as PCI, local bus etc. The second control unit takes over the computation results of the first control unit, e.g. the range image or parts of the range image, and controls the first control unit. In the second control unit, the received image data is analyzed using seat occupancy classification algorithms. It is possible to detect, for example, the position of an occupant on a vehicle seat, the position of the occupant's head, the position of a child seat or an unoccupied vehicle seat. The resulting data is forwarded to an airbag control unit (ACU).

The camera optics of an image sensor are subject to manufacturing tolerances. To compensate for the manufacturing tolerances, the rectification table associated with the given camera optics is preferably determined at the end of the production line by buffering the image data of a reference image acquired by one of the image sensors in a first memory. This first memory can be in the first or the second control unit. Using an initialization routine, the appropriate rectification table is created and stored in this first memory so that the storage space of the first memory is advantageously used twice. This initialization routine is preferably executed in the second control unit. The rectification table is stored in a read-only memory of the first control unit. Alternatively, the rectification table is stored in the read-only memory of the second control unit, e.g. a flash memory, and transferred to the first control unit at startup.

DETAILED DESCRIPTION OF THE INVENTION

Figure 1:
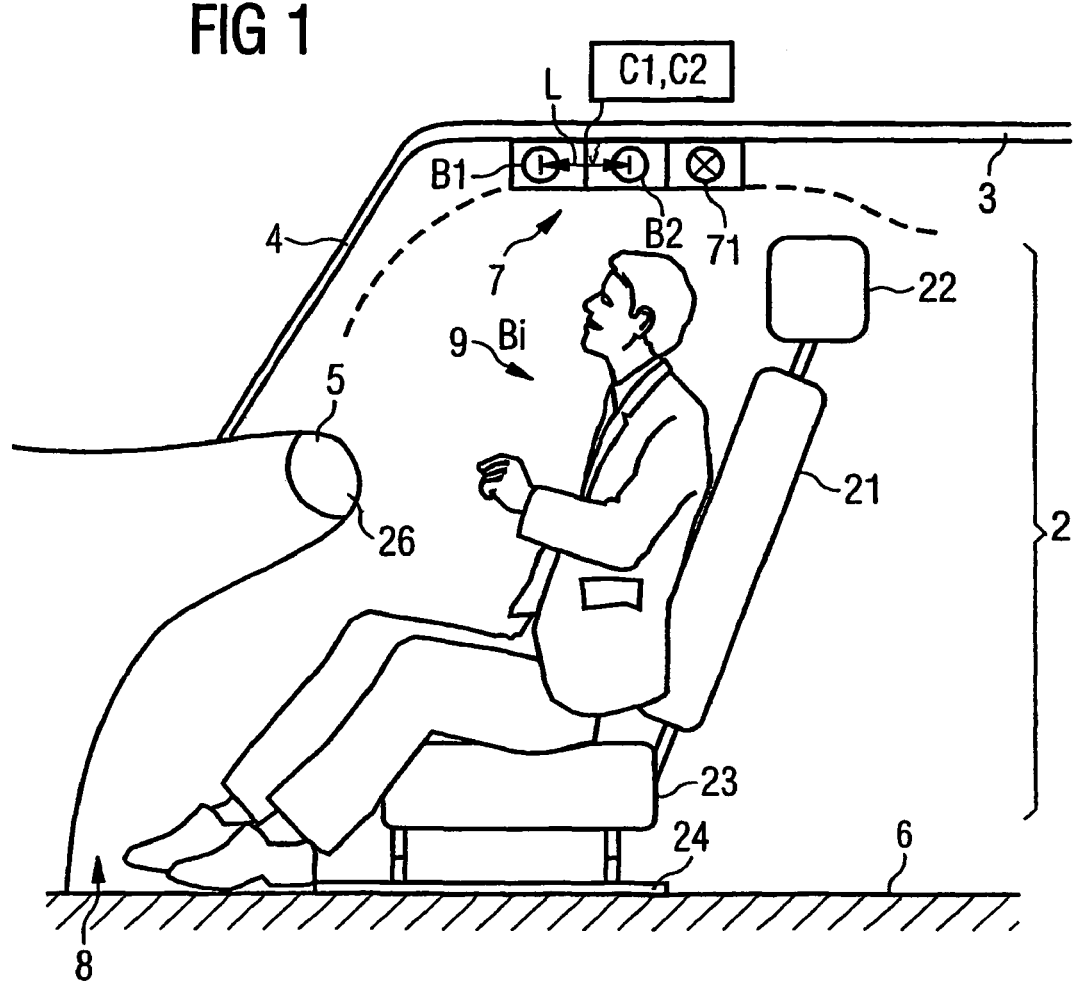
FIG. 1 shows the interior of a vehicle with an optical imaging system.

FIG. 1 schematically illustrates a vehicle 1 in which there is preferably located a vehicle seat 2 having a seat pad 23, a backrest 21 and a head restraint 22 mounted thereon. In the lining of the vehicle roof 3 there is disposed, preferably between the two front seats, an optical camera system 7, 71, B1, B2, C1,C2 with which a predefined image area Bi of the vehicle interior can be captured. Preferably two image sensors B1, B2 cover the image area Bi comprising the vehicle seat 2 with any subject 9 located thereon via a camera optical system. In FIG. 1, the subject 9 is schematically illustrated as a vehicle occupant.

In further embodiments the subject 9 can be a child seat, objects or similar, or the vehicle seat 2 can be unoccupied.

In the front part of the vehicle 1, under the windshield 4, there is disposed a dashboard 5 below which there is a footwell 8 for the feet and legs of the occupant 9 and in which an airbag 26 is located. The lower extremity of the footwell 8 is delimited by the vehicle floor 6 on which seat rails 24 are disposed. In the area of the lower part of the seat pad 23, the vehicle seat 2 is connected to the seat rail 24 via supports. The vehicle seat 2 is therefore displaceably disposed in the X-direction, i.e. the vehicle direction.

The camera system 7 preferably comprises two image sensors B1, B2, a light source 71 preferably equipped with a plurality of light-emitting diodes or at least one laser diode, and an analysis unit C1,C2. The image area Bi is illuminated both by the light source 71 and by any available ambient light. The optical axes of the two image sensors B1, B2 have a predefined spacing L. This enables range information of the subjects in the predefined image area Bi to the camera system 7 to be acquired from the images captured by the two image sensors B1, B2 using stereo image processing methods. The camera 7 preferably incorporates the two image sensors B1, B2 and the light source 71 in a compact housing. The analysis unit C1, C2 is likewise preferably disposed in the same compact housing, as the volume of data transmitted by the image sensors B1,B2 to the analysis unit C1,C2 is high. The exemplary image sensor B1 preferably has a matrix-shaped pixel arrangement with a resolution of 320× 288 pixels and a grayscale depth or grayscale resolution of 8 bits=256 grayscale values per pixel. Using two image sensors B1 and B2 and a minimum sampling rate of 50 images per second per image sensor results in an overall data transmission rate between the image sensors B1,B2 and the analysis unit C1,C2 of 320×288×8×2×50=73.728 Mbit/s.

In another embodiment, only one image sensor B1 or B2 is provided, thereby reducing the costs. Here, the required range information is preferably obtained from optical delay measurements or other image processing methods.

Figure 2:
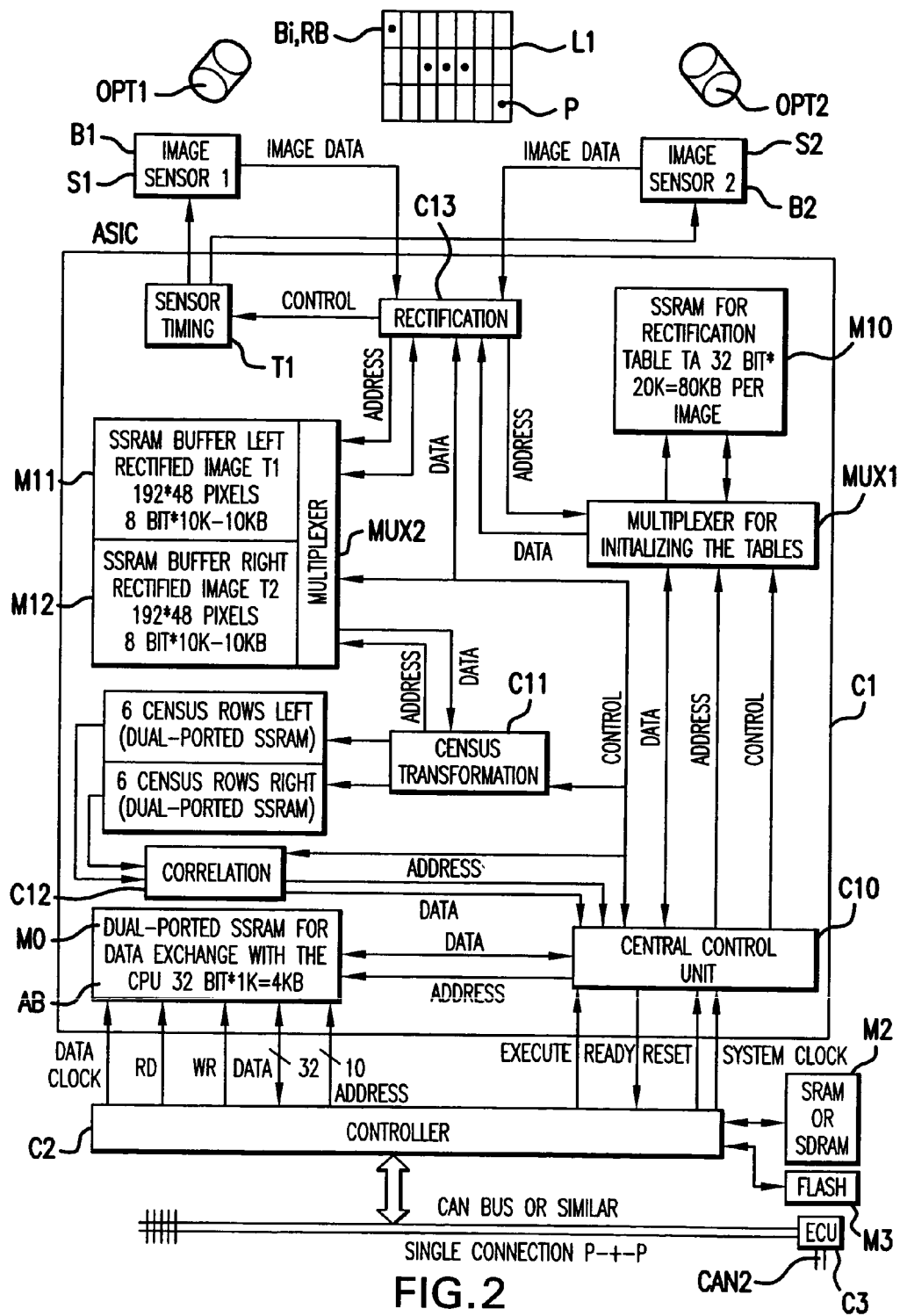
FIG. 2 is a block diagram of an arrangement for image processing.

FIG. 2 shows the block diagram of an image processing arrangement. Two image sensors B1 (left) and B2 (right) each capture an image area Bi via an optical system OPT 1, OPT 2. As essentially identical processes occur in the two image sensors B1, B2, the image processing operation will now be described using the example of the left image sensor B1.

The image to be captured of the image area Bi is distorted by the optical system OPT 1 with the result that a distorted source image S1 is produced in the image sensor B1. The image sensor B1 is preferably controlled by a first control unit C1. A sensor timing unit T1 in the first control unit C1 supplies the necessary control signals precisely timed for the image sensor B1. The source image S1 captured by the image sensor B1 must be read out within a short time, e.g. at a sampling rate of 50 images per second in a few milliseconds. In addition, because of the analog design of the image sensor B1, the storage time of a source image S1 in the image sensor B1 is short.

The image data present in the image sensor B1 is transmitted pixel by pixel to the first control unit C1, a pixel at a predefined pixel address containing a grayscale value. The image data supplied by the image sensor B1 is processed by a rectification controller C13 in the first control unit C1. The rectification controller C13 controls the correction of the source image S1 to produce a target image T1. The source image S1 is essentially mapped into a target image T1 pixel by pixel using a rectification table TA stored in a memory M10. The corrected (rectified) left target image T1 and the corresponding right target image T2 are stored in a buffer (target memory) M11, M12 in the first control unit C1. A census transformer C11 reads out at least parts of the two target images T1, T2, processes them and correlates the parts of the left and the right target image T1, T2 with one another to obtain range information of the captured image.

The correlation is preferably performed in a correlator C12 to which 6 preprocessed rows of the left target image T1 and 6 preprocessed rows of the right target image T2 are fed. The range image AB which has been correlated and provided with range information is stored in a memory M0. Preferably only a few rows of the correlated image are stored or transformed. A central control unit C10 located in the first control unit C1 controls all the functional blocks T1, C13, MUX1, MUX2, C11, C12 contained in the first control unit C1, and the memories M10, M11, M12, M0. Upstream of the target memories M11, M12 and the memory M10 there are provided multiplexers MUX2, MUX1 with which the central control unit C10 controls the memory accesses to the individual memory areas.

The central control unit C10 is preferably controlled by a second control unit C2. The second control unit C2 is largely exempt from the time-critical requirements for reading out the image sensors B1, B2 and subsequent rectification and correlation of the image data and is therefore time-decoupled. Consequently, the control unit C2 can react flexibly to external events initiated e.g. by an airbag control unit C3 connected via an interface. The second control unit C2 is equipped with a main memory M2 and a nonvolatile memory M3. At the request of the second control unit C2, the corrected and correlated image data stored in memory M0 of the first control unit C1 is preferably transferred to said second control unit. In addition, the second control unit C2 supplies the system clock and transmits commands (Execute) to the central control unit C10 of the first control unit C1. The image data transferred by the memory M0 is further processed in the second control unit C2. In the second control unit C2, a pattern recognition algorithm is executed by which the occupancy state of a vehicle seat is classified from the image data.

Advantageously, because of the memory M10, M11, M12 present in the first control unit C1, no external memory with a corresponding number of required lines is necessary.

Figure 3:
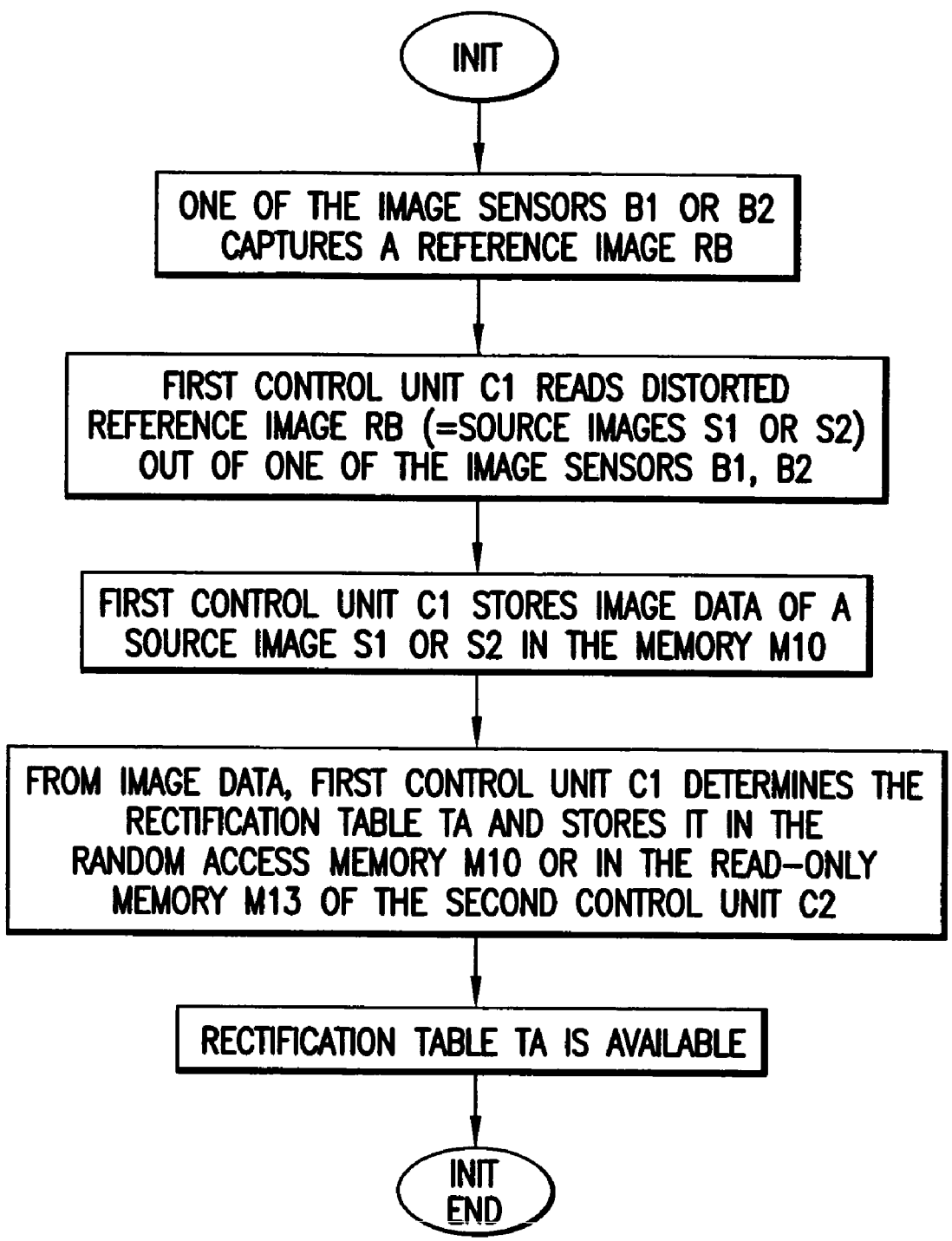
FIG. 3 is a flowchart of an initialization routine for compensating for optical system tolerances.

FIG. 3 shows the flowchart for initializing an image processing arrangement. The optical systems OPT1 and OPT2 are to be manufactured as inexpensively as possible, resulting in high manufacturing tolerances. As a result, each optical system OPT1, OPT2 is subject to different distortions. Using the initialization routine described below, a rectification table TA pertaining to the relevant optical system is created for each optical system at the end of the production line. As a result it is advantageously possible to compensate for even high manufacturing tolerances of an optical system type series.

At the start of the initialization routine, a reference image RB is held in a predefined position in front of the optical system OPT1 of the image sensor B1. The reference image RB exhibits a predefined pattern, e.g. vertical and horizontal lines L2,L1 and/or dots P each occupying a predefined position. The image sensor B1 now captures the reference image RB, thereby producing a distorted reference image, e.g. the source image S1 in the image sensor B1. The image data assigned to the source image S1 is read out by the first control unit C1 and stored in the memory M10. Using a predefined computational rule, the first control unit C1 determines the rectification table TA from the image data and stores it in the memory M10 or in the read-only memory M13 of the second control unit C2. The tabular data of the rectification table TA is subsequently copied to the memory M10 at initialization, e.g. when the occupant protection system is activated.

In a further embodiment, the computational rule to determine the rectification table TA is executed in the second control unit C2. This is possible, as the creation of the rectification table TA takes place at the end of the production line and is therefore not time-critical.

The rectification table TA is now available in a read-only memory M3. Initialization is therefore complete.

Figure 4:
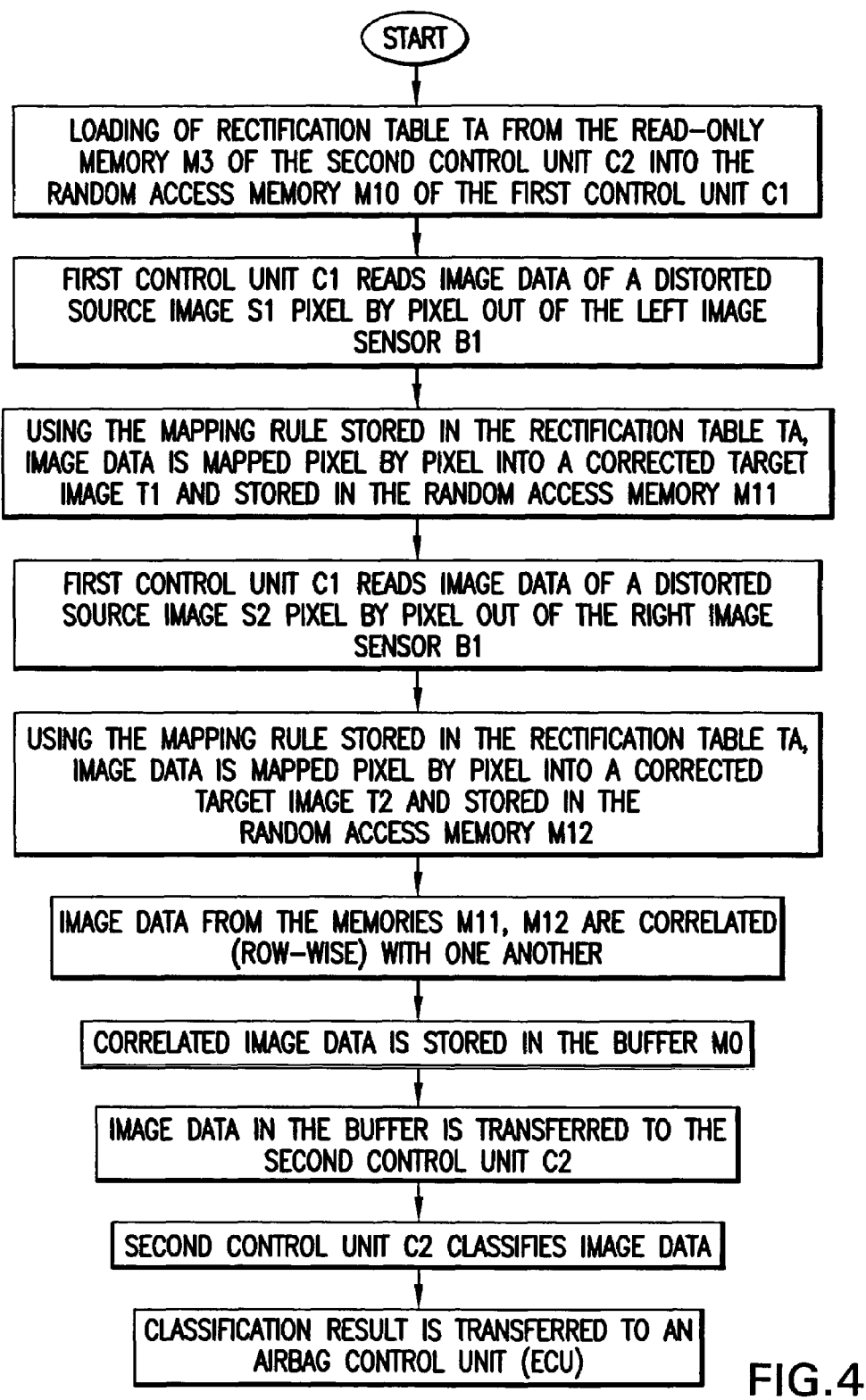
FIG. 4 is a flowchart of an image processing routine.

FIG. 4 shows the flowchart of an image processing routine. At the start of the routine the rectification table TA is loaded from the read-only memory M3 of the second control unit C2 into the memory M10 of the first control unit C1, the rectification table TA being exemplary for the processing of a source image S1 of the image sensor B1. A rectification table is preferably provided for each image sensor.

The first control unit C1 reads the image data of the distorted source image S1 out of the left image sensor B1 pixel by pixel. Using the mapping rule stored in the rectification table TA, the data is mapped pixel by pixel into a corrected target image T1 in the rectification controller C13 of the first control unit C1. The corrected target image T1 is stored in the memory M1. The image data of the distorted source image S2 is processed correspondingly. The resulting target image T2 is stored in the target memory M12.

The image data of the target images T1, T2 are preferably read out row-wise from the memories M11, M12 and processed using a predefined census transform to produce left and right census rows, preferably six for each left and right image, which are buffered and correlated row-wise with one another. The image data of the pixels of the correlated rows additionally contains range information and is stored in the memory M0. On request, this image data is transferred to the second control unit C2 which now classifies the transferred image data using pattern recognition algorithms. The classification result is transmitted to the airbag control unit C3 (ACU).

The first control unit C1 is preferably implemented as an ASIC (Application Specific Integrated Circuit) or FPGA (Field Programmable Gate Array). The second control unit C2 is preferably implemented as a microcontroller or microprocessor. The first and the second control unit C1, C2 can be incorporated in one housing and interconnected via conductive tracks. In a further embodiment, the first and the second control unit C1, C2 can be integrated in a package or even on a chip. In the second control unit C2, triggering decisions for occupant protection systems can be additionally implemented.

In the first control unit C1, a large number of operations are performed in parallel, whereas in the second control unit C2 only a small number of operations or a single operation are processed in parallel.

The invention claimed is:

1. An arrangement for processing image data in imaging systems for occupant protection systems, comprising:
   a first control unit which, in real time, reads out from at least one image sensor, grayscale values of the image data as source image pixels;
   an optical system which distorts the image data, where the first control unit corrects the image data distorted by the optical system using a tabular mapping rule so that a target image is produced and provides range information of the target image; and
   a second control unit for controlling the first control unit and taking over the target image data and the range information of the target image processed by the first control unit, the second control unit performing seat occupancy classification, wherein
   by mapping the source image into the target image according to the mapping rule, the target image having fewer pixels than the source image can be obtained.

2. The arrangement according to claim 1, wherein the first control unit contains a rectification table stored in a first memory and which can be used to execute the mapping rule for correcting the image supplied by the image sensor.

3. The arrangement according to claim 2, wherein to initialize the rectification table, image data of a reference image captured by one or more image sensors is stored in the first memory.

4. The arrangement according to claim 1, wherein the first control unit is implemented as an ASIC or FPGA, the second control unit is implemented as a microcontroller or microprocessor, and the first and the second control units are disposed separately or one of in an IC package andon a chip.

5. The arrangement according to claim 1, wherein two image sensors are present, the first control unit correlating the corrected image data in each case to produce a range image.

6. The arrangement according to claim 1, wherein at least one image sensor is linked via the first control unit to the second control unit.

7. A method for processing image data in imaging systems for occupant protection systems, comprising:
   reading the image data available in an image sensor of a source image distorted by an optical system from the image sensor by a first control unit in which the image data is corrected in real time using a tabular mapping rule so that a target image is produced and is provided with range information, whereby a seat occupancy classification is carried out using in a second control unit which controls the first control unit, the corrected target image data and range information taken from the first control unit is provided with range information and classified,
   wherein
   the target image has fewer pixels than the source image.

8. The method according to claim 7, wherein
a pixel under a predefined pixel address contains a grayscale value.

9. The method according to claim 7, wherein
the target image or the image data of the target image is buffered in a memory of the first control unit.

10. The method according to claim 7, wherein
if a first and a second image sensor are present, the two corrected target images produced are correlated rowwise with one another to determine range information,
the resulting image pixels or image data of the image pixels provided with disposed in at least one image row, are buffered in a memory of the first control unit, and
at the request of a second control unit, the buffered image pixels or image data of the image pixels are transferred to the second control unit for further processing, vehicle seat occupancy classification being performed in the second control unit.

11. The method according to claim 10, wherein
the result of the vehicle seat occupancy classification is forwarded to a central occupant protection control unit.

12. The method according to claim 10, wherein
a predefined reference image is captured by at least one image sensor to initialize or create a rectification table,
the captured reference source image is read out of the image sensor and stored in a first memory,
the rectification table is created from the stored reference source image, and
the created rectification table is stored in the first memory, whereby
the reference source image stored in the first memory is at least partially overwritten by the rectification table.

13. The method according to claim 12, wherein
the reference source image has a predefined pattern.

14. The method according to claim 12, wherein
the reference source image is captured by the two image sensors and used as reference for the correlation.

15. The method according to claim 12, wherein
a rectification table is provided for each image sensor or one rectification table is available for all the image sensors.

16. The method according to claim 7, wherein
a system clock of the second control unit is essentially independent of a system clock of the first control unit.

17. The method according to claim 7, wherein
image processing in the first control unit is executed in parallel with classification in the second control unit.

18. The method according to claim 7, wherein
the first and the second control unit operate largely independently of one another.

* * * * *